US012738437B2

(12) United States Patent
Yang

(10) Patent No.: US 12,738,437 B2
(45) Date of Patent: Sep. 15, 2026

(54) ACTIVE ARC FAULT CIRCUIT INTERRUPTERS WITH SOLID-STATE COMPONENTS

(71) Applicant: Siemens Industry, Inc., Alpharetta, GA (US)

(72) Inventor: Guang Yang, Johns Creek, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 176 days.

(21) Appl. No.: 18/769,866

(22) Filed: Jul. 11, 2024

(65) Prior Publication Data

US 2026/0018358 A1 Jan. 15, 2026

(51) Int. Cl.
*H01H 71/12* (2006.01)
*H01H 83/20* (2006.01)
*H02H 1/00* (2006.01)

(52) U.S. Cl.
CPC .......... *H01H 71/123* (2013.01); *H01H 83/20* (2013.01); *H02H 1/0015* (2013.01); *H01H 2083/201* (2013.01)

(58) Field of Classification Search
CPC ................. H01H 71/123; H01H 83/20; H01H 2083/201; H02H 1/0015; H02H 3/08; G01R 19/2513; G01R 31/52
USPC ........................................................ 361/115
See application file for complete search history.

(56) References Cited

U.S. PATENT DOCUMENTS

2013/0335861 A1* 12/2013 Laschinski ........... H02H 1/0015 361/2
2015/0381111 A1* 12/2015 Nicolescu ............ H02H 1/0015 324/761.01
2021/0226441 A1* 7/2021 Telefus .................. H02H 3/162
2022/0247163 A1* 8/2022 Leidy ................. G01R 31/1272

* cited by examiner

*Primary Examiner* — Sreeya Sreevatsa

(57) ABSTRACT

A circuit breaker for active detection of an arc fault is provided. It comprises a set of power electronics configured to make an arc fault detection active, a current limiting resistor in series with the set of power electronics and a sensing and control circuitry coupled to the set of power electronics and stores in a memory for execution a detection algorithm code with a detection logic. The sensing and control circuitry monitors a load current of at least one device connected to the circuit breaker, the sensing and control circuitry detects an arc-like signal in the load current, and by monitoring a change of the arc-like signal during a short on/off period of power electronics, the detection algorithm code can determine if there is an arc in the circuit.

20 Claims, 3 Drawing Sheets

ACTIVE ARC FAULT CIRCUIT INTERRUPTERS WITH SOLID-STATE COMPONENTS

BACKGROUND

1. Field

Aspects of the present disclosure generally relate to a circuit breaker for active detection of an arc fault. Active arc fault circuit interrupters are provided with solid-state components.

2. Description of the Related Art

Circuit breakers are essential for electrical safeties. They feed current to loads that are connected to them, and interrupt the circuit once a circuit fault, such as overload, short circuit, ground fault and arc fault, is detected. In recent years, the requirement for installing arc fault circuit interrupters (AFCIs) has increased, given the proven reduction in risk of fire with AFCIs' protection. One holdback of AFCIs' further implementation is nuisance tripping with noisy loads. Such situations have created inconveniences for customers, and need to be addressed to fully realize AFCIs' benefits.

An active arc fault detection method with solid-state circuit breakers is possible. Although solid-state circuit breakers can execute a detection method, their relatively high cost makes their implementation limited.

Therefore, a circuit breaker is then needed to provide the circuit breaker for active detection of an arc fault.

SUMMARY

Briefly described, aspects of the present disclosure relate to a circuit breaker for active detection of an arc fault. This invention disclosure proposes an active arc fault detection method that can be used in traditional thermal-magnetic arc fault interrupters, which in general have lower cost. Existing AFCIs have been using passive detection methods. They receive signals from the circuit, process them either in time domain or frequency domain to extract certain features. These features are then used to make decisions on whether an arc presents or not. To reduce the chance for nuisance tripping, many decision making methods have been developed, from traditional case study based methods to machine learning based artificial intelligence methods. These advanced algorithms, especially the ones with machine learning principle, have shown good effectiveness in reducing nuisance tripping. This disclosure has introduced further active detection with solid-state circuit breakers. The advantage of the method over the prior ones is that the power electronics components are not continuously in the current path and only need to be switch on/off in short periods of time. As a result, much lower grade components can be used to save cost.

In accordance with one illustrative embodiment of the present disclosure, a circuit breaker for active detection of an arc fault is provided. It comprises a set of power electronics configured to make an arc fault detection active, a current limiting resistor in series with the set of power electronics and a sensing and control circuitry coupled to the set of power electronics and stores in a memory for execution a detection algorithm code with a detection logic. The sensing and control circuitry monitors a load current of at least one device connected to the circuit breaker, the sensing and control circuitry detects an arc-like signal in the load current, and by monitoring a change of the arc-like signal during a short on/off period of power electronics, the detection algorithm code can determine if there is an arc in the circuit.

In accordance with one illustrative embodiment of the present disclosure, a method for active detection of an arc fault in a circuit breaker is provided which comprises providing a set of power electronics configured to make an arc fault detection active, providing a current limiting resistor in series with the set of power electronics, and providing a sensing and control circuitry coupled to the set of power electronics and stores in a memory for execution a detection algorithm code with a detection logic, and wherein the sensing and control circuitry monitoring a load current of at least one device connected to the circuit breaker, the sensing and control circuitry detecting an arc-like signal in the load current, and by monitoring a change of the arc-like signal during a short on/off period of power electronics, the detection algorithm code can determine if there is an arc in the circuit.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
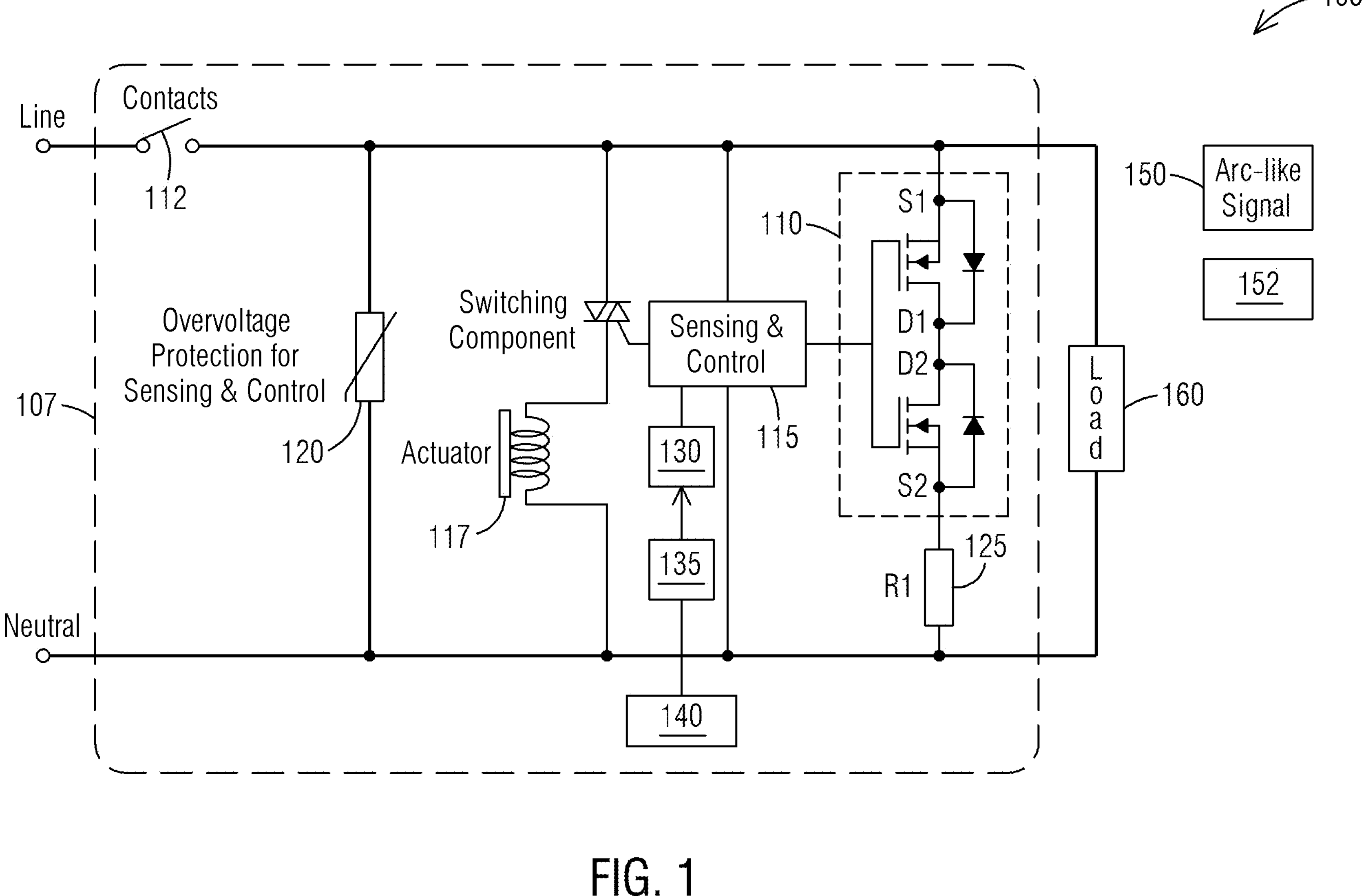
FIG. 1 illustrates a circuit breaker with AFCI construction with added power electronics components for active detection in accordance with an embodiment of the present disclosure.

Various technologies pertain to active arc fault circuit interrupters with solid-state components. A circuit breaker for active detection of an arc fault is presented. A method for active detection of an arc fault in a circuit breaker is provided. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present disclosure, they are explained hereinafter with reference to implementation in illustrative embodiments. In particular, they are described in the context of a circuit breaker for active detection of an arc fault. Embodiments of the present disclosure, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

These and other embodiments of the system are provided for a circuit breaker for active detection of an arc fault according to the present disclosure are described below with reference to FIG. 1 herein. The drawing is not necessarily drawn to scale.

Consistent with an embodiment of the present disclosure, FIG. 1 represents a circuit breaker 105 with an arc fault circuit interrupter (AFCI) construction 107 with added power electronics components such as a set of power electronics 110 for active detection in accordance with an embodiment of the present disclosure. Inside the AFCI construction 107, a pair of contacts 112 are used to interrupt the current when there's fault detected. A sensing and control circuitry 115 is used to monitor a circuit condition and detect circuit fault conditions along with necessary sensors, not shown in the FIG. 1. Once a fault is detected, the sensing and control circuitry 115 triggers an actuator 117 to open the contacts 112. An overvoltage protection device 120 is also commonly used to protect the sensing and control circuitry 115 under overvoltage conditions, such as voltage surge.

The set of power electronics 110 is configured to make an arc fault detection active. A current limiting resistor R1 125 is provided in series with the set of power electronics 110. For some embodiments, each power electronic component may be a MOSFET (metal-oxide-semiconductor field effect transistors). Two MOSFETS may be provided in a back-to-back configuration for alternating current applications.

The sensing and control circuitry 115 is coupled to the set of power electronics 110 and stores in a memory 130 for execution a detection algorithm code 135 with a detection logic 140. The sensing and control circuitry 115 monitors a load current of at least one device connected to the circuit breaker 105. The sensing and control circuitry 115 detects an arc-like signal 150 in the load current, and by monitoring a change of the arc-like signal 150 during a short on/off period of power electronics 110, the detection algorithm code 135 can determine if there is an arc in the circuit.

The circuit breaker 105 is an arc fault circuit interrupter (AFCI) that avoids nuisance tripping with noisy loads because of active detection. To reduce a chance for nuisance tripping, decision making methods such as machine learning based artificial intelligence methods provide good effectiveness in reducing nuisance tripping. An active arc fault detection method can be used in a thermal-magnetic arc fault interrupter. As a result, much lower grade components can be used to save cost.

The circuit breaker 105 further comprises the actuator 117 and the contacts 112. The sensing and control circuitry 115 is used to monitor a circuit condition and detect circuit fault conditions and once a fault is detected, the sensing and control circuitry 115 triggers the actuator 117 to open the contacts 112.

The sensing and control circuitry 115 turns the set of power electronics 110 on and off in short periods of time, ~10 us to ~100 us. The circuit breaker 105 wherein such turning on and off can be scheduled based on the needs of the detection algorithm code 135 and the current limiting resistor 125 can be selected in such a way that once the set of power electronics 110 are on, the current flows through the set of power electronics 110 and the current limiting resistor 125 causes temporary short circuit and voltage collapse on a load 160.

Once a load voltage is lost, arcs and nuisance tripping loads respond differently to a voltage loss. The arc-like signal 150 reduces/disappears right away in case of arcs, due to a fast-responding time or the arc-like signal 150 maintains for certain periods of time in case of nuisance tripping loads, due to a capacitance that is often associated with electronics. The set of power electronics 110 are not continuously in a current path and only need to be switch on/off in short periods of time.

Figure 2:
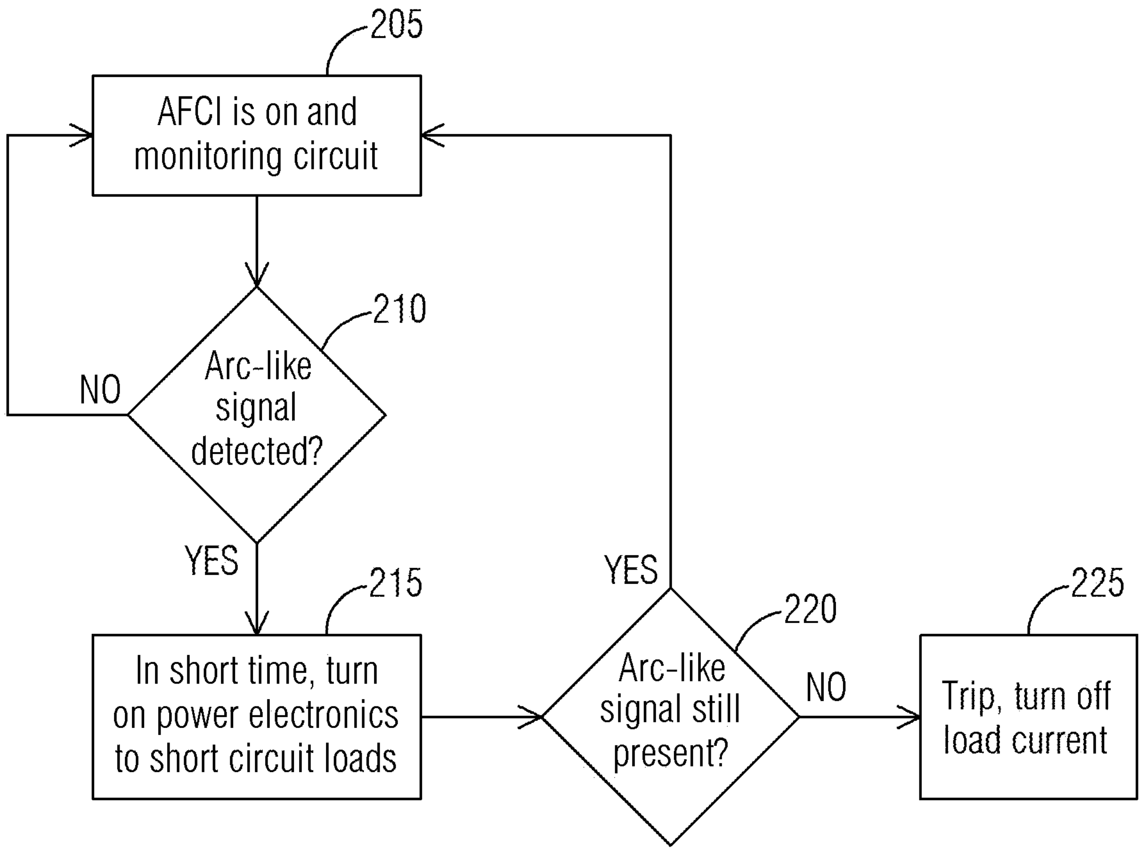
FIG. 2 shows a flow chart of a detection logic in accordance with an embodiment of the present disclosure.

Referring to FIG. 2, it shows a flow chart of a detection logic in accordance with an embodiment of the present disclosure. In step 205, AFCI is on and monitoring the circuit. Next, in a decision step 210, a check is made as to whether an arc-like signal is detected. If yes, in a next step 215, in a short time, turn on power electronics to short-circuit loads. If no arc-like signal is detected, return to the step 205. Next, in a decision step 220, a check is made as to whether an arc-like signal is still present. If no arc-like signal is present, go to the step 225 and trip, turn off load current. If an arc-like signal is present, return to the step 205.

Arc Fault Circuit Interrupters (AFCIs) are a type of circuit breaker that use electronic components to detect and respond to potentially dangerous electrical arcs in home wiring. AFCIs monitor the electrical waveform and open the circuit if they detect changes that are characteristic of a dangerous arc. They can also distinguish between normal arcs, like those created when a switch is turned on, and arcs that can cause fires.

New technology has emerged that will detect an arc fault and de-energize the circuit before a fire can start. The new technology is an "Arc-Fault Circuit Interrupter" (AFCI) circuit breaker. This new device has electronic components in them to analyze the sine wave of an electrical arc and de-energize the circuit.

Arc-Fault Circuit Interrupters (AFCIs) are a type of circuit breaker that use electronic components to actively monitor electrical waveforms and detect arc faults. AFCIs monitor voltage and current waveforms for changes that indicate the presence of an arc fault. AFCIs use algorithms to identify arc faults based on characteristics like discontinuities, frequencies, and inconsistencies in the waveforms. They can also look at the rising and falling edges of the current signal.

If AFCIs detect changes that indicate a dangerous arc, they interrupt the circuit to de-energize it and prevent a fire. AFCIs must also be able to differentiate between safe arcs, like those that occur when a switch is turned on or a plug is removed, and arcs that could cause a fire.

Figure 3:
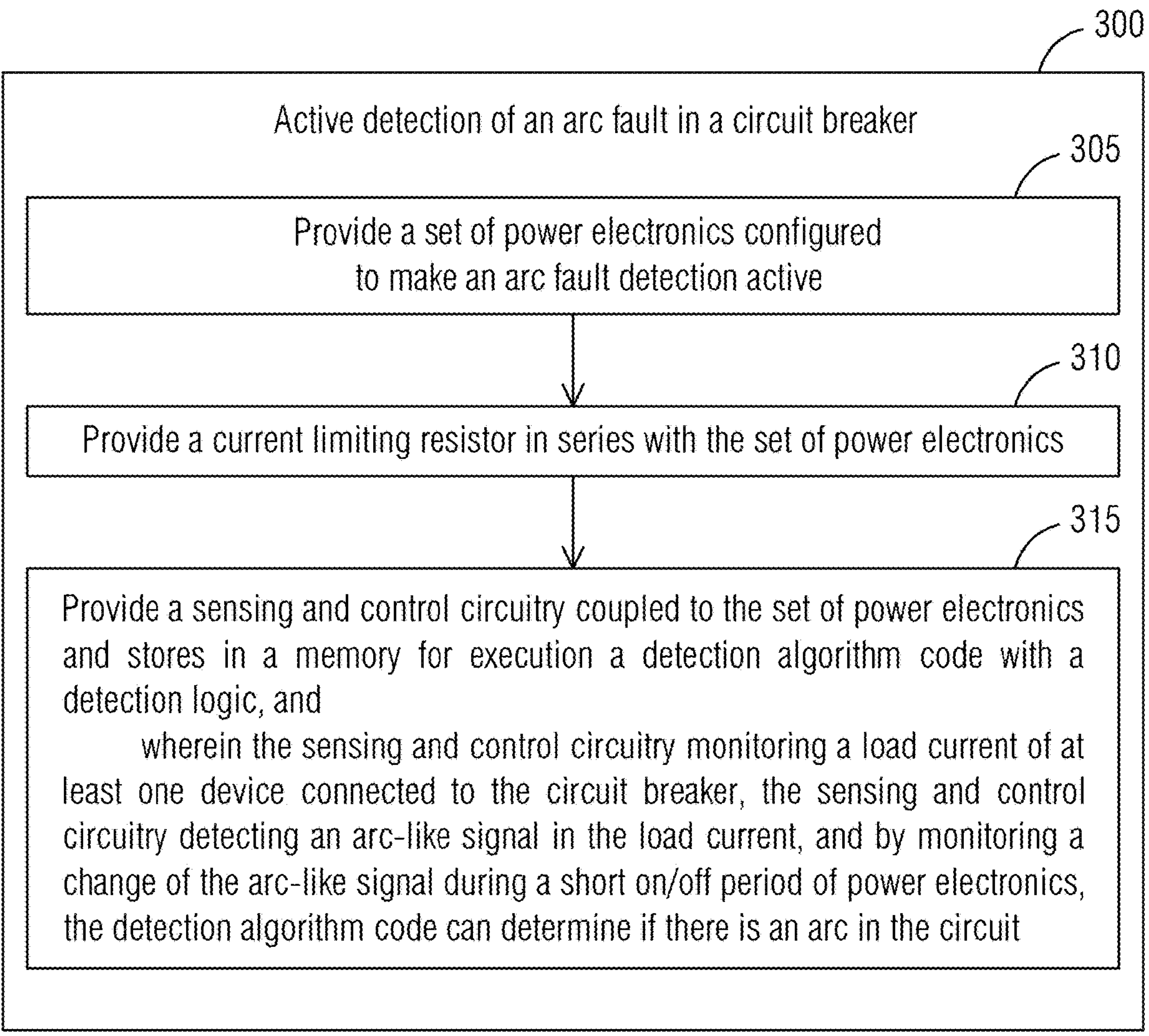
FIG. 3 illustrates a flow chart of a method for active detection of an arc fault in a circuit breaker in accordance with an embodiment of the present disclosure.

Turning now to FIG. 3, it illustrates a flow chart of a method 300 for active detection of an arc fault in the circuit breaker 105 in accordance with an embodiment of the present disclosure. Reference is made to the elements and features described in FIGS. 1-3. It should be appreciated that some steps are not required to be performed in any particular order, and that some steps are optional. Accordingly, the circuit breaker 105 provides active detection of arc fault due to its capabilities of fast switching and controllable load current characteristics.

Existing AFCIs have been using passive detection methods. They receive signals from the circuit, process them either in time domain or frequency domain to extract certain features. These features are then used to make decisions on whether an arc presents or not. To reduce the chance for nuisance tripping, many decision making methods have been developed, from traditional case study based methods to machine learning based artificial intelligence methods. These advanced algorithms, especially the ones with machine learning principle, have shown good effectiveness in reducing nuisance tripping.

For some embodiments, a controller may decrease power temporarily to one or more connected devices in response to detecting the arc-like signal in the load current. After a brief, temporary period of time, the controller may restore the power to the connected device or devices after a temporary period of time after decreasing the power to the connected device or devices. The temporary period of time is from the time of decreasing the power to the time of restoring the power. The controller captures a temporary period signal in the load current during this temporary period of time, i.e., subsequent to decreasing the power temporarily to the connected device(s) and prior to restoring the power to the connected device(s). The controller then determines whether the arc-like signal is present in the temporary period signal.

The method 300 comprises a step 305 of providing a set of power electronics configured to make an arc fault detection active. The method 300 further comprises a step 310 of providing a current limiting resistor in series with the set of power electronics. The method 300 further comprises a step 315 of providing a sensing and control circuitry coupled to the set of power electronics and stores in a memory for execution a detection algorithm code with a detection logic. The sensing and control circuitry monitoring a load current of at least one device connected to the circuit breaker. The sensing and control circuitry detecting an arc-like signal in the load current. And by monitoring a change of the arc-like signal during a short on/off period of power electronics, the detection algorithm code can determine if there is an arc in the circuit.

While an active arc fault detection method that can be used in traditional thermal-magnetic arc fault interrupters is disclosed, other types of circuit breakers are possible. For example, other lower cost based systems may be implemented based on one or more features presented above without deviating from the spirit of the present disclosure.

The techniques described herein can be particularly useful for active detection with solid-state circuit breakers. While particular embodiments are described in terms of active detection, the techniques described herein are not limited to such active detection but can also be used as a combination with passive detection.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the disclosure has been described with reference to specific embodiments. However, one of ordinary skill in the art appreciates that various modifications and changes can be made without departing from the scope of the disclosure. Accordingly, the specification and figures are to be regarded in an illustrative rather than a restrictive sense, and all such modifications are intended to be included within the scope of disclosure.

Although the disclosure has been described with respect to specific embodiments thereof, these embodiments are merely illustrative, and not restrictive of the disclosure. The description herein of illustrated embodiments of the disclosure is not intended to be exhaustive or to limit the disclosure to the precise forms disclosed herein (and in particular, the inclusion of any particular embodiment, feature or function is not intended to limit the scope of the disclosure to such embodiment, feature or function). Rather, the description is intended to describe illustrative embodiments, features and functions in order to provide a person of ordinary skill in the art context to understand the disclosure without limiting the disclosure to any particularly described embodiment, feature or function. While specific embodiments of, and examples for, the disclosure are described herein for illustrative purposes only, various equivalent modifications are possible within the spirit and scope of the disclosure, as those skilled in the relevant art will recognize and appreciate. As indicated, these modifications may be made to the disclosure in light of the foregoing description of illustrated embodiments of the disclosure and are to be included within the spirit and scope of the disclosure. Thus, while the disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope and spirit of the disclosure as set forth. Therefore, many modifications may be made to adapt a particular situation or material to the essential scope and spirit of the disclosure.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the disclosure.

In the description herein, numerous specific details are provided, such as examples of components and/or methods, to provide a thorough understanding of embodiments of the disclosure. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the disclosure. While the disclosure may be illustrated by using a particular embodiment, this is not and does not limit the disclosure to any particular embodiment and a person of ordinary skill in the art will recognize that additional embodiments are readily understandable and are a part of this disclosure.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A circuit breaker for active detection of an arc fault comprising:

a set of power electronics configured to make an arc fault detection active;

a current limiting resistor in series with the set of power electronics; and a sensing and control circuitry coupled to the set of power electronics and stores in a memory for execution a detection algorithm code with a detection logic, and wherein the sensing and control circuitry monitoring a load current of at least one device connected to the circuit breaker, the sensing and control circuitry detecting an arc-like signal in the load current, and by monitoring a change of the arc-like signal during a short on/off period of power electronics, the detection algorithm code can determine if there is an arc in the circuit.

2. The circuit breaker of claim 1, wherein the circuit breaker is an arc fault circuit interrupter (AFCI) that avoids nuisance tripping with noisy loads.

3. The circuit breaker of claim 1, wherein an active arc fault detection method that can be used in a thermal-magnetic arc fault interrupter.

4. The circuit breaker of claim 1, wherein decision making methods comprising machine learning based artificial intelligence methods reduce nuisance tripping.

5. The circuit breaker of claim 1, further comprising:

an actuator; and contacts, wherein the sensing and control circuitry is used to monitor a circuit condition and detect circuit fault conditions and once a fault is detected, the sensing and control circuitry triggers the actuator to open the contacts.

6. The circuit breaker of claim 1, wherein the sensing and control circuitry turns the set of power electronics on and off in short periods of time, ~10 us to ~100 us.

7. The circuit breaker of claim 6, wherein such turning on and off can be scheduled based on the needs of the detection algorithm code and the current limiting resistor can be selected in such a way that once the set of power electronics are on, the current flows through the set of power electronics and the current limiting resistor causes temporary short circuit and voltage collapse on a load.

8. The circuit breaker of claim 7, wherein once a load voltage is lost, arcs and nuisance tripping loads respond differently to a voltage loss.

9. The circuit breaker of claim 8, wherein the arc-like signal reduces/disappears right away in case of arcs, due to a fast-responding time or the arc-like signal maintains for certain periods of time in case of nuisance tripping loads, due to a capacitance that is often associated with electronics.

10. The circuit breaker of claim 1, wherein the set of power electronics are not continuously in a current path and only need to be switched on/off in short periods of time.

11. A method for active detection of an arc fault in a circuit breaker, the method comprising:

providing a set of power electronics configured to make an arc fault detection active;

providing a current limiting resistor in series with the set of power electronics; and providing a sensing and control circuitry coupled to the set of power electronics and stores in a memory for execution a detection algorithm code with a detection logic, and wherein the sensing and control circuitry monitoring a load current of at least one device connected to the circuit breaker, the sensing and control circuitry detecting an arc-like signal in the load current, and by monitoring a change of the arc-like signal during a short on/off period of power electronics, the detection algorithm code can determine if there is an arc in the circuit.

12. The method of claim 11, wherein the circuit breaker is an arc fault circuit interrupter (AFCI) that avoids nuisance tripping with noisy loads.

13. The method of claim 11, wherein an active arc fault detection method that can be used in a thermal-magnetic arc fault interrupter.

14. The method of claim 11, wherein decision making methods comprising machine learning based artificial intelligence methods reduce nuisance tripping.

15. The method of claim 11, further comprising:

providing an actuator; and providing contacts, wherein the sensing and control circuitry is used to monitor a circuit condition and detect circuit fault conditions and once a fault is detected, the sensing and control circuitry triggers the actuator to open the contacts.

16. The method of claim 11, wherein the sensing and control circuitry turns the set of power electronics on and off in short periods of time, ~10 us to ~100 us.

17. The method of claim 16, wherein such turning on and off can be scheduled based on the needs of the detection algorithm code and the current limiting resistor can be selected in such a way that once the set of power electronics are on, the current flows through the set of power electronics and the current limiting resistor causes temporary short circuit and voltage collapse on a load.

18. The method of claim 17, wherein once a load voltage is lost, arcs and nuisance tripping loads respond differently to a voltage loss.

19. The method of claim 18, wherein the arc-like signal reduces/disappears right away in case of arcs, due to a fast-responding time or the arc-like signal maintains for certain periods of time in case of nuisance tripping loads, due to a capacitance that is often associated with electronics.

20. The method of claim 11, wherein the set of power electronics are not continuously in a current path and only need to be switched on/off in short periods of time.

* * * * *